April 9, 1968     D. W. COLE ETAL     3,376,684
DOUBLE REVERSE CORRUGATED MATERIAL Filed Oct. 16, 1963     3 Sheets-Sheet 1

INVENTORS
DONALD W. COLE
RICHARD K. MAY
BY
*Charles W. Woodward*
ATTORNEY

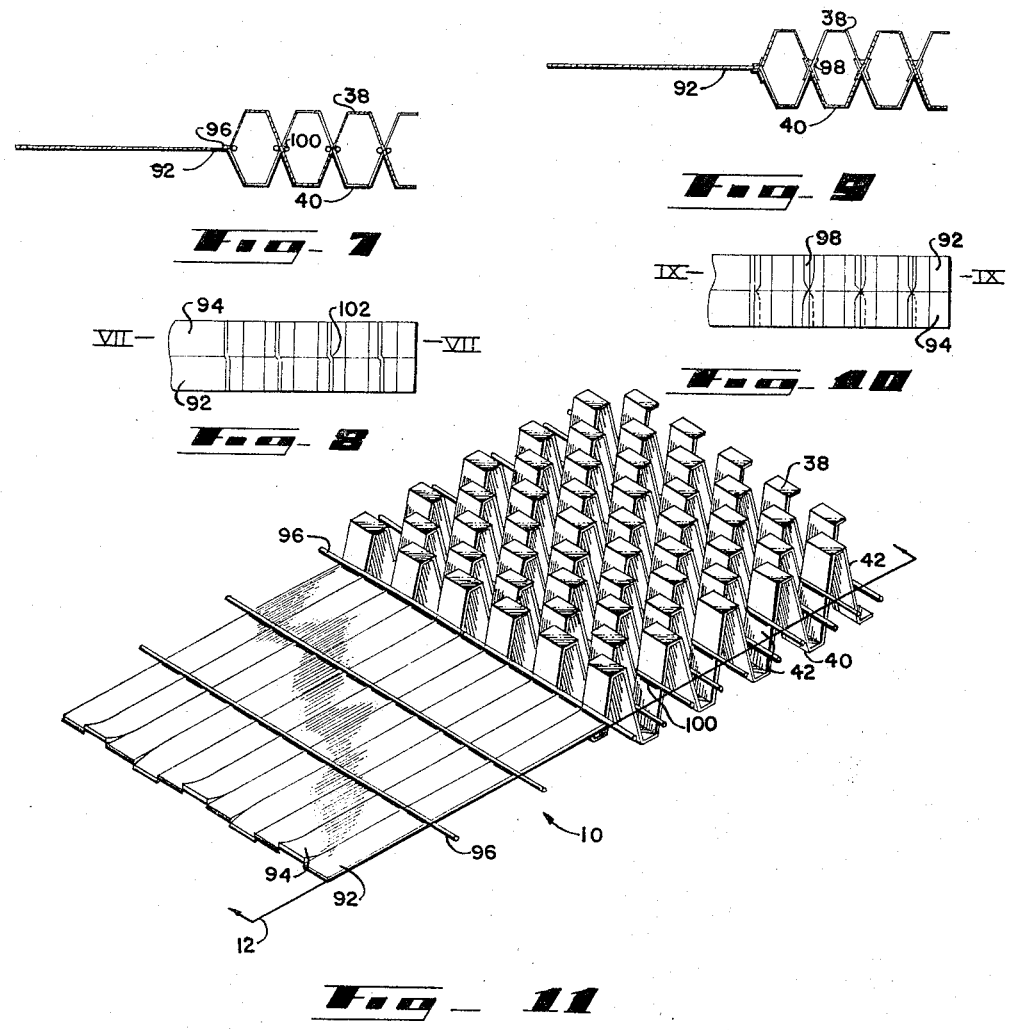

United States Patent Office 3,376,684
Patented Apr. 9, 1968

3,376,684
DOUBLE REVERSE CORRUGATED MATERIAL
Donald W. Cole, Weatherford, and Richard K. May, Fort Worth, Tex., assignors to General Dynamics Corporation, Fort Worth, Tex., a corporation of Delaware
Filed Oct. 16, 1963, Ser. No. 316,732
4 Claims. (Cl. 52—635)

The present invention relates generally to structural materials and their method of manufacture. More particularly the invention is directed to an open, trussform or reticulated structural material and process for making same, which is particularly well adapted for use as a low density, high strength core in making sandwich panel composite structures. Such sandwich composite structures are commonly employed in the manufacture of aircraft, missiles and spacecraft. The present core material is particularly adaptable for structural use in such vehicles as are customarily subjected to unusually high temperatures and therefore weld attachments of one or both face plates to the core is a desideratum.

Heretofore, various structures have been evolved for this purpose. The nearest construction to the present core material depends upon thin, deeply corrugated sheet metal having open ends in its corrugation, whereby mandrels can be inserted and face skins can thus be resistance welded to both sides of the core structure.

A number of disadvantages are inherent in these structures and deleterious effects result from the use thereof. Foremost of these resides in the fact that simple corrugations are unidirectional and therefore while they afford considerable rigidity in one direction, very little is afforded in the other. Further, such known corrugated structures, having truss-like characteristics, embody median sections which must remain constant thereby providing heat transfer media from the outer facing to the inner facing on the same order of magnitude throughout the corrugation's section. To compensate for the former condition, when employing a given skin thickness, the pitch span of the corrugation must be reduced in order to permit full development of skin strength in compression. Such reduction increases the weight penalty of the core and draws further penalties in poor column geometry and increased difficulties in producibility; one of the most severe of the latter being the near impossibility of forming such core to compound curvatures and the inherent contraflexure or saddling effect created when formed in either a compound or simple curvature along any of its axis.

Briefly described, the present invention contemplates a unitary, open or reticulated corrugated sheet material preferably manufactured from a flat metal stock sheet that is provided with longitudinally cut, slit or chemically etched slots; each slot being laterally displaced from the next slot and successive slots being longitudinally spaced so as to allow a relief area, as sections between said slots are alternately raised and depressed to form the corrugation. After such formation the resulting corrugation may be used in this intermediate state or, when desired, the truss elements extending between the upper and lower crest-bend nodal flats may be straightened and beaded to impart additional strength and rigidity thereto. Provision is included in a modified version or embodiment for reducing the area of the cripples, (strut-like members extending from said crest-bend nodal flats to the median plane fold apex or median fold) by removing a portion of the material therefrom, such as by precutting a triangular slot or alternately an area shaped like a small segment of a circle; the frustrum of a pyramid or a rectangular box section, etc., in the flat metal sheet. The open structure lends itself to traverse fluid conduction (both liquid and gas), while the reduced median section is effective in reducing heat and electrical conductivity through the structure. Further, the multi-plane geometry of the structure adapts it well for use as a framework for a molded matrix of refractory material, such as ceramic heat shield material, with provision for back-up insulating materials to be deposited in cavities not filled by the embedded refractory material. Such multi-plane geometry also lends itself well to the construction of meteorite shielding panels, either as a single layer panel or a multi-layer laminated structure; thus providing deflective surfaces for impinging meteorite particles as may be encountered by vehicles that are employed for space travel.

It is therefore an object of the invention to provide a corrugated structural material and method for manufacture thereof that is particularly adapted as a weldable core material, by modifying the well-known conventional method of corrugating by alternately reversing the corrugations so as to halve the pitch span of the resultant structure without alteration of its weight, depth or overall area.

Another object of the invention is to provide a structure and process for the manufacture thereof which is adapted to serve as weldable core material yet is not limited by the unidirectional characteristic or contraflexure effect inherent in other corrugations known to the art.

A further object of the invention resides in the provision of a weldable or brazable core material, as characterized by an open truss-like structure, which lends itself to transverse fluid conduction and within the interstices of which fluids, fibers, foams, solids and the like may be impounded.

A yet further object is to provide a bondable, brazable or weldable core material of truss-like character which has its median section reduced in area to minimize the surface to surface conductivity of transient heat and electricity.

A still further object is to provide a structure of the above class and character which is well adapted to serve as a skeletal framework for a molded matrix, such as ceramics and other refractory materials to form a heat barrier when the composite is subjected to extremely high temperatures as may be generated by nose cones and space vehicles upon re-entry into the earth's atmosphere.

A still further object resides in the provision of a multi-plane, unitary structure that is well suited to serve as a protective and deflective barrier against minute meteorite impingement and penetration when employed as an element or elements of the outer wall or enclosure of missile nose cones, space vehicles and the like.

These and other objects and advantages of the invention will become more apparent to those versed in the art upon consideration of the following description and the appended drawings, wherein.

Figure 5:
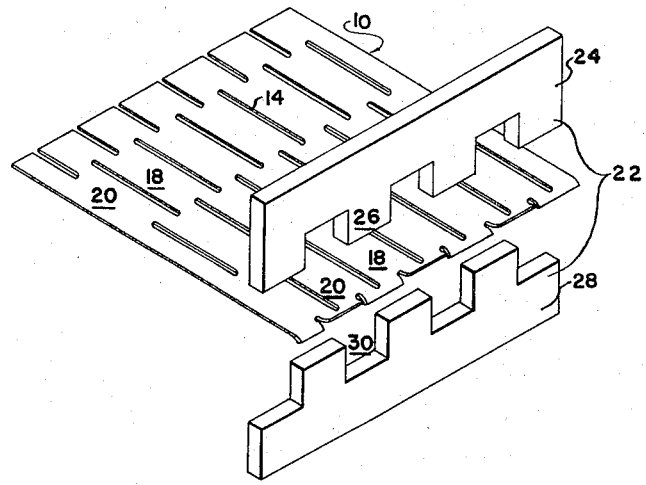

FIGURE 5 schematically illustrates a matched tooth corrugation forming die set as employed for alternately raising and depressing sections between slotted flat stock sheet material and shows a preferred method for initially forming the corrugations of the invention.

Figure 6:
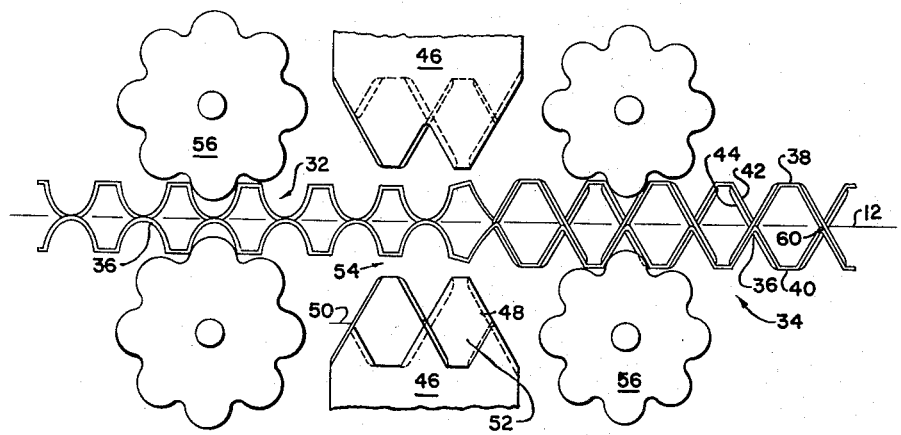

FIGURE 6 is a schematic illustration of the preferred embodiment of the feed and die mechanism employed to impart final strike to the corrugation in fabrication of the invented material.

FIGURE 7 is a cross-sectional view of a portion of a second embodiment of the present invention wherein warp wire is employed at the median plane to provide a rotational axis.

FIGURE 8 is a plan view of FIGURE 7 further illustrating the warp of the interconnecting wire.

FIGURE 9 is a cross-sectional view of a third embodiment of the present invention wherein metal strips are employed to effect transverse connection of individual ribbon members.

FIGURE 10 is a plan view of FIGURE 9 further illustrating the twist effected by the metal strips during the forming operations.

FIGURE 11 is a pictorial view of the second embodiment.

Figure 1:
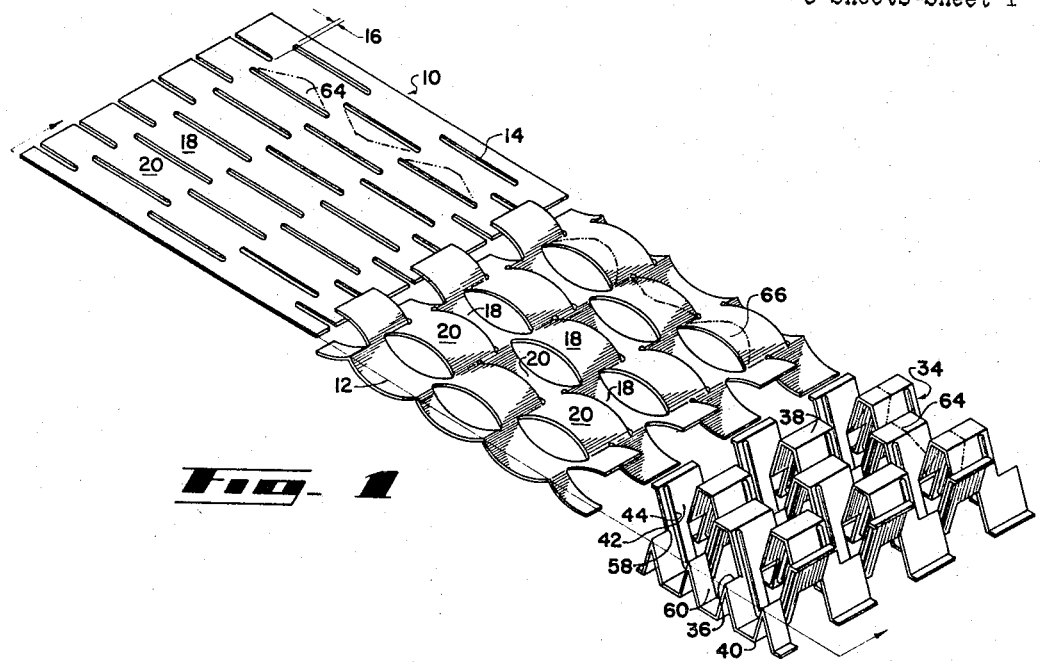
FIGURE 1 is a pictorial illustration of the progressive geometry of the invented article wherein progression from slotted or slitted flat sheet stock to the finished reversely corrugated article, as formed during fabrication thereof, is shown.

Construction of the invention and progression of the corrugation forming steps are best shown in FIGURE 1, wherein flat sheet stock material 10 defines a median plane 12 in the geometry of its fabrication. Sheet 10 is pre-slotted as at 14, while in flat sheet form. Dimensional arrangement of slots 14, which are pierced through sheet 10 by means of piercing die (not shown), by chemical etching, or other known means, determines the finished configuration of the invented reticulated structure or core material as well be hereinafter shown. In effect, slots 14 are symmetrically staggered, off-set or laterally displaced row from row and column from column with slot ends 14 projecting slightly into longitudinally adjacent rows so as to provide a relief area 16 as sections between these slots are alternately raised and depressed to form the corrugation. Material in areas 18 and 20 between slots 14 are alternately raised and depressed from median plane 12, thus expanding the material in a direction normal to the median plane while contracting or foreshortening the material longitudinally. Lateral dimensions of the workpiece 10 remain unchanged.

As shown in FIGURE 5, toothed brake dies 22 may be employed in a conventional sheet metal brake (not shown) for bending or forming areas 18 and 20. Such matched die set 22 normally consists of an upper die element 24 having tenon-like projections 26 which are adapted to slidably engage lower die element 28 by entering mortise-like notch or cut-out 30 in a slip-fit engagement. Thus, with pre-slotted sheet 10 having been positioned between die members 24 and 28, the material in the areas 18 and 20 between slots 14 are alternately displaced upward and downward to form a corrugation as exemplified by 32 in FIGURE 6.

The corrugation of the present invention is best illustrated by FIGURE 1 which shows a portion of a sheet in finished configuration comprising corrugations 34 having median folds 36 positioned substantially on median plane 12 and crest-bend nodes 38 and 40 displaced above and below the median plane respectively. Truss elements or web portions 42 extend between nodes 38 and 40 and may have stiffening beads 44 formed therein to impart rigidity thereto.

FIGURE 6 is illustrative of the manner of forming the sheet to its final configuration as described above. Corrugations 34 are herein termed, for convenience, "final strike" corrugations, and are the final stage of forming or fabricating, resulting from restriking "initial strike" corrugation 32. This restrike is accomplished by a set of matched dies 46 having flattened projections 48 extending outwardly from a median plane 50 and "cup-like" cavities 52 extending inwardly therefrom. The projections 48 of one die are positioned so that they align with cavities 52 of the opposing die. Initial strike corrugated material 32 is fed into re-strike area 54 by means of suitable feed mechanisms, illustrated schematically by toothed wheels 56 which are adapted to conform with the rate-of-strike of dies 46.

As is apparent, when first-strike material 32 is re-struck by dies 46, the heretofore mentioned median folds 36 are creased at the median plane 12 and upper crest-bend node 38 and lower nodes 40 are creased in their upper and lower planes respectively. Stiffening beads 44 may be impressed in truss portions 42 at this time, if desired.

It will, of course, be apparent that the corrugated material resultant from thea bove described "initial strike" operation and as shown in FIGURE 1 are useful while in this configuration, although it does not possess the strength and rigidity of the "final strike" configuration, it is more economical.

During this re-strike operation, relief overlapping 16 of slots 14 (FIGURE 1) by rows and columns affords stress concentration relief gullets 58 which preclude cracking or tearing at the terminal ends of slots 14 when the corrugated structure is stressed.

It is apparent from the above that the resultant open, reticulated or trussform structural material is mainly characterized by two basic and integrally connected elements, viz., beaded strut-like members 42 which extend between the upper and lower crest-bend nodals 38 and 40 and cripples 60, which are members extending from median fold 36 to the crest-bend nodals 38 and 40. When reduced crest nodal area 38 is desirable and permissible, a portion of the cripples 60 may be removed for lightness or to reduce its cross-sectional area, thereby reducing its capacity for heat and electrical conductivity. This is accomplished by pre-cutting a triangular slot 64 in the flat metal sheet or alternatively by pre-cutting and removing an area 66 therefrom that substantially defines the segment of a circle; the frustrum of a pyramid or rectangular box section (not shown). Such modification does not alter or affect the forming operation, the envelope or any major dimensions of the resultant structural material; obviously the corrugated material is lightened by removal of the areas of material indicated by numeral 64 (FIGURE 1).

It will be apparent to those skilled in the art that the symmetrically reversed corrugation thus formed results in an effective pitch one-half that of the conventional or previously known corrugation of the same basic geometry. It will also be apparent that the open spaces across the axis of the reversed corrugation induce omnidirectional strength characteristics, while the staggered or off-set arrangement of the crests decreases any tendency toward line failure in face skins bonded to this structure when employed as core material. It is further notable that the structure of the present invention precludes the development of contraflexure due to anticlastic curvature, commonly referred to as saddling, which is inherent in known corrugated and other articulated material, such as cellular core. Such anticlastic curvature is due to intrinsic structural characteristics which are fully described in the text: Airplane Structures, Vol. I, page 373, by Niles and Newell.

Figure 2:
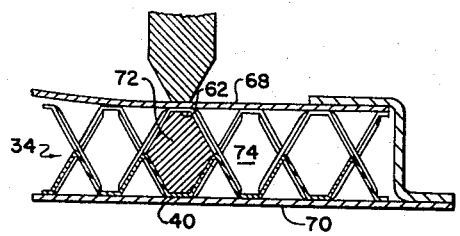
FIGURE 2 shows, in cross-section, a portion of a sandwich type structural panel composite embodying the invented structure as the core component thereof and further serves to illustrate the manner in which a resistance welding electrode and mandrel are employed for resistance welding facing sheets or skins to upper and lower crest-bent nodes of the invented corrugated material.

As shown in FIGURE 2, resistance welding of upper and lower face skins 68 and 70, respectively, to the reversed corrugation's crest nodes 38 and 40 may be accomplished by insertion of a conductive mandrel 72 through openings 74 of truss structure 34. Mandrel 72 which may be water cooled, supports the structure 34 against the pressure of welding and conducts current to the weld point, thus shunting the current away from the beaded struts 42, preventing their over-heating.

Figure 3:
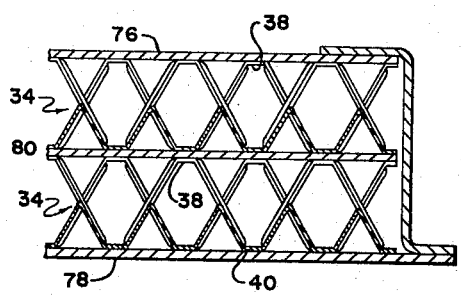
FIGURE 3 is a cross-sectional view of a portion of a tiered or laminated structural composite and particularly illustrates the present invention as employed to provide a plurality of core laminae in a space vehicle composite panel which serves as a shield and trap to prevent meteorite particle penetration into such vehicle.
Figure 4:
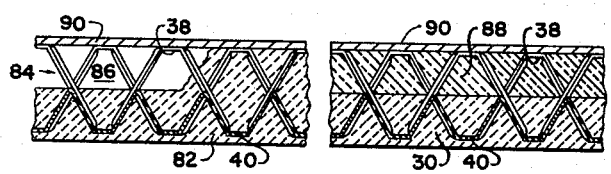
FIGURE 4 is a cross-sectional view showing the present invention when employed as the skeletal framework for molded ceramic heat shield materials and as further adapted to impound insulating materials within its interstices or portions thereof.

Other uses and adaptations of the present corrugated structure are exemplified in FIGURES 3 and 4. In FIGURE 3 the invented structure 34 is shown as being tiered or laminated, and welded or otherwise joined to outer face plates or skins 76, 78, and an intermediate sheet or plate 80. This forms a multi-plane composite structure which may be employed readily as a structural part of a nose cone, space vehicle or the like to provide a cover shield or deflective barrier against the penetration into such vehicle of meteorite particles and similar space refuse. The multi-plane configuration of this structure always presents an angular and therefore deflective surface to impinging or penetrating meteorite particles.

The present structure, as shown in FIGURE 4, may also be adapted to serve as the skeletal framework component 84 for a molded matrix 82 of refractory material, such as ceramic or other high heat resistant material, to form a composite structure. Such a structure is well suited to serve as the outer surface for the leading edges and nose cones of missiles, rockets, aerospace vehicles and the like which require a heat barrier that will protect the underlying structure when subjected to the high temperatures generated by atmospheric friction upon re-entry into the earth's atmosphere. Skeletal framework 84 may be completely embedded in the molded ceramic material 82 or alternately may be partially embedded with the dead air space of the remaining open area 86 serving as an insulator. Other insulating material 88, such as fibrous, granular, bat and crystalline insulator materials, may be impounded within the interstices in open area 86 when deemed advantageous or desirable. In all instances the composite heat barrier structure is welded, brazed, bonded or otherwise attached to the vehicle's outer surface 90 at each of the inner crest nodes 38 of corrugated skeletal structure 34.

FIGURE 11 illustrates a second embodiment of the present invention. This embodiment resides in a plurality of contiguously positioned metal foil ribbons exemplified by 92 and 94, longitudinally juxtapositioned to define median plane 12 and interconnected to form composite sheet 10 by any suitable means, such as by malleable wires 96 or metal strips 98, attached to said ribbons at predetermined intervals, as illustrated in FIGURES 7, 8, 9 and 10.

This configuration is functionally equivalent to slotted sheet 10 in the embodiment of FIGURE 1. Corrugation of the ribbon portions between wires 96 or strips 98 is accomplished in a manner similar to that of the first embodiment in that adjacent ribbons 92 and 94 are alternately raised and depressed from median plane 12 by matched dies 46 and their associated feed mechanisms 56, thereby expanding ribbons 92 and 94 in a direction normal to median plane 12 while simultaneously foreshortening the material longitudinally. Matched dies 46 rate-of-strike and geometric configuration are predetermined to cooperate with the aforementioned interconnecting transverse wires 96 or strips 98. Spacing is such that the axis of relative rotation between that portion of the adjacent ribbons 92 and 94 forming truss members 42 falls upon the median plane 12 and forms an inter-truss connection 100.

During corrugation, the interconnecting transverse wires 96 or metal strips 98 are caused to twist and warp, as at 42, by the relative biased movement of ribbons 92 and 94 upon the opposing surfaces of dies 46 and the relative rotation of ribbons 92 and 94 during the formation of adjacent trusses 42, thus facilitating maintenance of the proper inter-ribbon median plane relationship, as exemplified by FIGURES 7, 8, 9 and 10.

Several advantages are inherent in this embodiment; the foremost being the elimination of an expensive, time consuming punching or slotting operation which is required in producing that embodiment shown in FIGURE 1. Further ribbon or strip materials may be employed that are not produced in wide sheets. In addition, optional variations in structural strengths and selective load transferring capabilities are made possible merely by effecting slight dimensional adaptations of interconnecting wire 36 or strip elements 38.

Manufacture of unlimited lengths and widths of the present trussform structure or core is made possible by employment of ribbon material which can be readily spliced, and filament or cloth reinforced plastic may be employed in the structure without limitation to the preferred metal form.

It should be noted here that it is within the scope and intent of this invention that the median attachment or placement of the interconnecting wire or metal strips can be accomplished subsequent to formation of the corrugations, or that such interconnecting elements may be entirely eliminated by a cross-butt-welding of the ribbons, edge to edge, at the median plane or inter-truss junction.

Although only the preferred embodiments for carrying out the invention have been described above, it is not to be construed that our invention is limited by such embodiments. Other modifications or embodiments may be made by those skilled in the art without departing from the spirit and scope of the invention as defined by the claims.

As thus described, the open trussform or reticulated structure of the present invention may be characterized broadly as an improved double-reverse corrugation, formed from preslited or pre-slotted flat sheet material. But it may be most clearly described, in geometry, using as a base a conventional corrugation upon which additional forming operations are performed. A conventional corrugation would comprise a sheet material having a "sine-wave" like form comprising alternate crests and troughs, the corrugation being a complete sine wave. The additional operations would consist, in effect, of the cutting of parallel and equidistant slots or slits from the top side of the corrugation normal to the axis of the corrugation and slightly more than halfway through the corrugation. That is through the crests of the imagined corrugation to a point just below the median plane. Thereafter cutting corresponding slots from the opposite or underneath side of the imagined corrugation with the spacing being midway between the slots which had been previously cut from the first side, so that the slots do not meet at the neutral axis of the corrugation but overlap each other slightly at the median or neutral axis where they are equidistantly staggered. This, in effect, forms a plurality of crests and troughs across the corrugation, each defined by the slots in the crests or trough. That is, the crest portion of the corrugation is segmented, and the trough portion is segmented, the segments of the trough being offset from those of the crest. Then reversing alternate ones of the crest segments so that half of the segments across the crest of the corrugation are reversed downwardly. Next, reversing alternate ones of the segments in the trough of the corrugation so that these, in turn, extend upwardly and become in effect crests located between the original crests, thus halving the pitch of the original corrugation, and then beading or creasing the struts or legs connecting the crests or troughs respectively, to increase the rigidity and enhance the column strength of said struts. It will, of course, be understood that the above is a graphic description of the geometry of the invention, and does not describe, necessarily, a specific forming process.

We claim:
1. An open reticulated structural material comprising:
 A. a plurality of upper nodes each having an apex of finite width lying in and and defining a discontinuous planar surface;
 B. a plurality of lower nodes of troughlike configuration each having a bottom portion of finite width defining a discontinuous lower planar surface;

said upper and lower planar surfaces spaced from and lying on each side of a median plane and joined by truss-like members;

C. each said truss-like member extending substantially linearly from an upper node to the lower node next adjacent thereto, (1) said truss-like members being joined at their midportion to torsional means lying along a median plane, said means establishing torsional axes along said median plane operative to permit universal deflection of said structural material without permanent deformation, (2) said nodes respectively lying in the same plane and being staggered from one another.

2. The material defined in claim 1 wherein:

A. said means joining said trusslike members comprising a plurality of folds, some of said folds having their apex upwardly and others having their apex downwardly, B. cripple portions extending from each said fold to the nodes adjacent thereto, said folds and cripple portions providing a torsional restitution means for said reticulated structure when bending in any axis is induced therein.

3. A unitary, multi-plane, omnidirectionally resilient double reverse corrugated structural element comprising:

A. a plurality of oppositely directed trough and crest nodes defining upper and lower planes at their node extremities;

(1) longitudinally alternate crest nodes being offset transversely from one another;

(2) longitudinally alternate trough nodes being offset transversely from one another;

(3) said crest nodes alternating with said trough nodes in the transverse direction;

B. fold portions defining an intermediate plane, (1) some of said folds having the apex directed upwardly and others thereof having the apex directed downwardly, (2) said first named folds being aligned in a longitudinal direction and contiguous to alternate ones of said longitudinally aligned crest portions;

(3) said second named folds being aligned in a longitudinal direction and contiguous to alternate ones of said longitudinally aligned trough portions;

(4) said first and second named folds being spaced transversely from one another by a portion of at least one trough and one crest;

(5) each said fold having cripple portions extending from the apex of said fold, (a) said cripples forming a portion of the corrugation whose node apex is opposite in direction to the apex of said fold and extending from said fold apex to said node apex;

C. truss portions interconnecting each said crest node with the offset longitudinally adjacent trough nodes and forming a portion thereof;

said fold-cripple-truss relationship operative to permit universal flexure of said corrugated element about any axis individually or simultaneously.

4. A double reverse corrugated core comprising:

A. a multiplicity of upper crest-bend nodes and lower crest-bend nodes;

B. said nodes being at opposite extremities of an interconnecting truss member and equidistant from the plane of corrugation;

C. said upper and lower crest-bend nodes being in transverse rows wherein said upper and lower nodes are alternately raised and depressed from said plane of corrugation and adjacent rows are offset by one-half the width of said node, one half of said truss member thus reversing direction and constituting a cripple portion of a truss member for the adjacent oppositely directed node;

D. said cripples formed by the legs of folds which define said medial plane and operative to permit universal deflection of said core about any axis.

References Cited

UNITED STATES PATENTS

| | | | |
|---|---|---|---|
| 1,018,399 | 2/1912 | Livingston | 72—379 X |
| 2,828,843 | 4/1958 | Hill | 72—379 X |
| 2,858,247 | 10/1958 | Deswart | 52—618 X |
| 2,989,145 | 6/1961 | Goodloe | 29—6.1 X |
| 3,083,662 | 4/1963 | Zeidler | 72—379 X |
| 3,217,845 | 11/1965 | Reynolds et al. | 52—618 X |

FOREIGN PATENTS 648,828   1/1951   Great Britain.

HENRY C. SUTHERLAND, Primary Examiner.

FRANK L. ABBOTT, Examiner.

M. O. WARNECKE, Assistant Examiner.